S. C. KINGMAN, 2 Sheets—Sheet 1.

Assignor to WHEELER & WILSON MANUFACTURING CO.

MACHINE FOR GROOVING SEWING MACHINE NEEDLES.

No. 9,884. Reissued Sept. 27, 1881.

WITNESSES.

L. F. Connor

A. Reynolds

INVENTOR.

Samuel C. Kingman by Crosby & Gregory

Attys.

N. PETERS, Photo-Lithographer, Washington, D. C.

2 Sheets—Sheet 2.

S. C. KINGMAN,

Assignor to WHEELER & WILSON MANUFACTURING CO.

MACHINE FOR GROOVING SEWING MACHINE NEEDLES.

No. 9,884. Reissued Sept. 27, 1881.

WITNESSES—

L. F. Connor

A. Reynolds

INVENTOR

Samuel C. Kingman by Crosby & Gregory

Attys.

N. PETERS, Photo-Lithographer, Washington, D. C.

UNITED STATES PATENT OFFICE.

SAMUEL C. KINGMAN, OF BRIDGEPORT, CONN., ASSIGNOR TO WHEELER & WILSON MANUFACTURING COMPANY, OF SAME PLACE.

MACHINE FOR GROOVING SEWING-MACHINE NEEDLES.

SPECIFICATION forming part of Reissued Letters Patent No. 9,884, dated September 27, 1881.

Original No. 158,947, dated January 19, 1875. Application for reissue filed January 8, 1881.

*To all whom it may concern:*

Be it known that I, SAMUEL C. KINGMAN, of Bridgeport, in the county of Fairfield and State of Connecticut, have invented a new and Improved Machine for Grooving the Blades of Sewing-Machine Needles; and I do hereby declare the following to be a full, clear, and exact description of the construction and operation of the same, reference being had to the accompanying drawings, making a part of this specification.

In this my invention I have devised means for simultaneously grooving two or more sewing-machine needles while they, held in a suitable clamp, are moved under the grooving-cutters.

In needle-grooving machines heretofore used employing rotary milling-cutters the latter have generally been placed by a hand operation into cutting contact with and made to enter the body of the needle being grooved; but in one instance, as in United States Patent No. 33,707, the cutters in their approach to and into the wire forming the needle blade or body have been controlled by a cam.

In this my invention I have devised an organized machine for grooving the blades of independent needle-blanks, the said machine being composed of a clamp to hold the blade of the needle-blank to be grooved, and a clamp-moving carriage having a half-nut, a feed-screw to move the carriage, and a rotating grooving or milling cutter, combined with a former or cam shaped to determine the time during the longitudinal movement of the carriage at which the cutter shall strike the blade of the blank, the said former or cam also determining the length, depth, and contour of the groove made by the cutter, and with means to automatically release the feed-screw and half-nut and stop the movement of the carriage as the groove in the blade is completed.

Similar letters of reference indicate corresponding parts.

Figure 1:
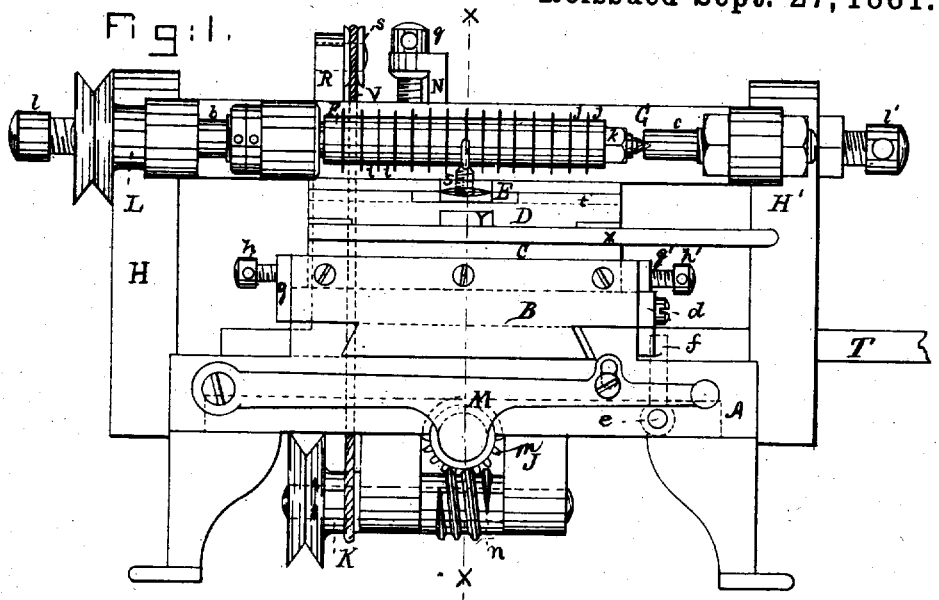
Figure 2:
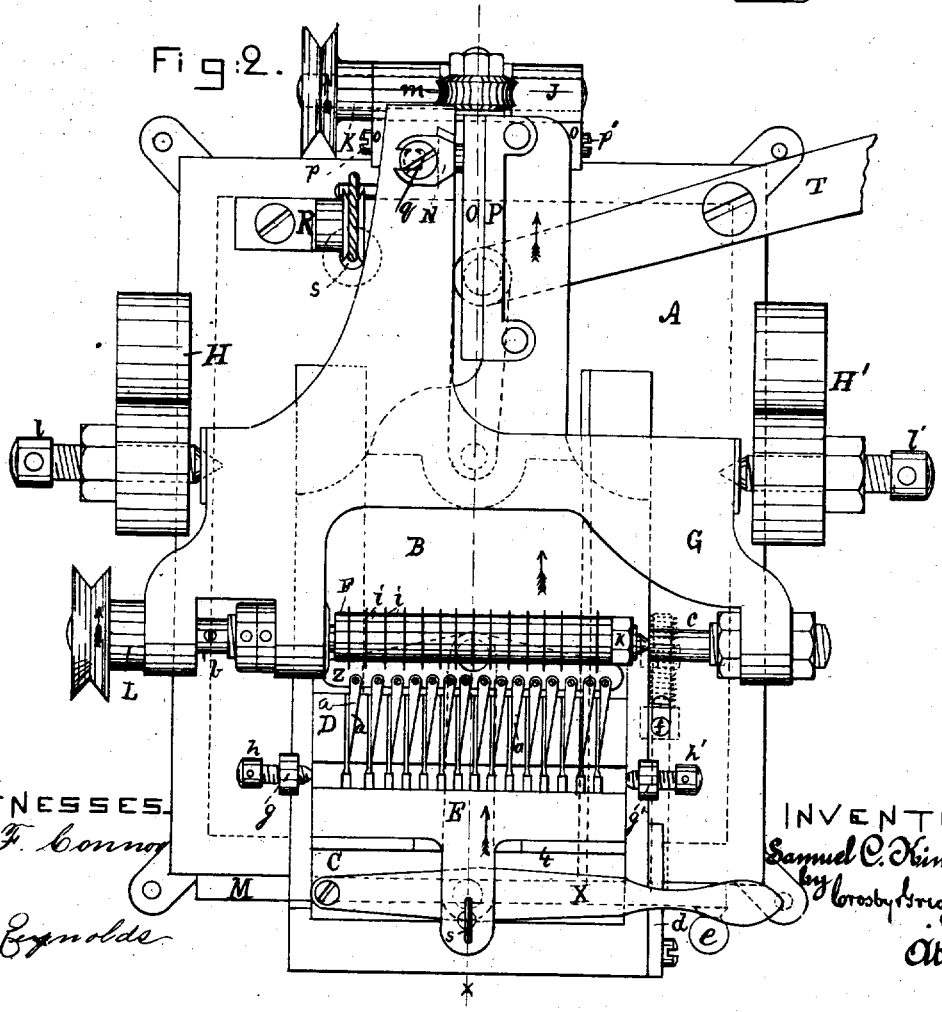
Figure 3:
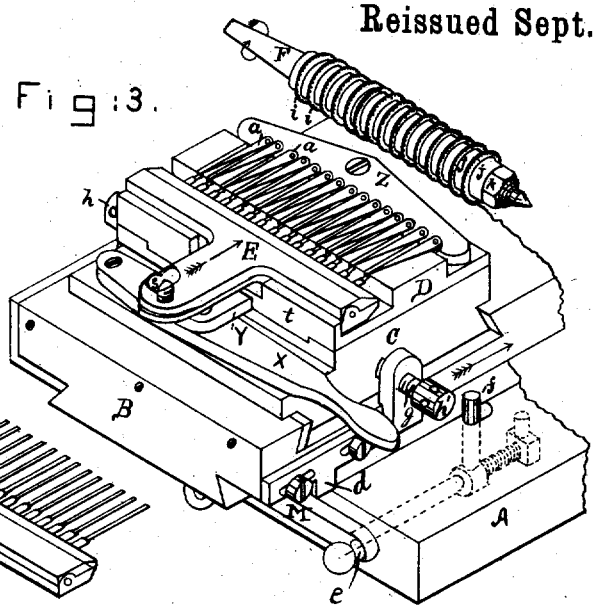
Figure 7:
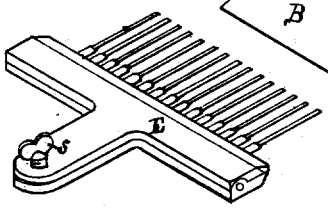
Figure 6:
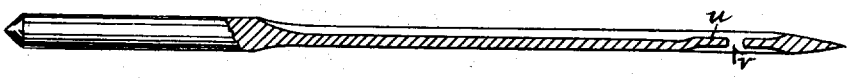
Figure 4:
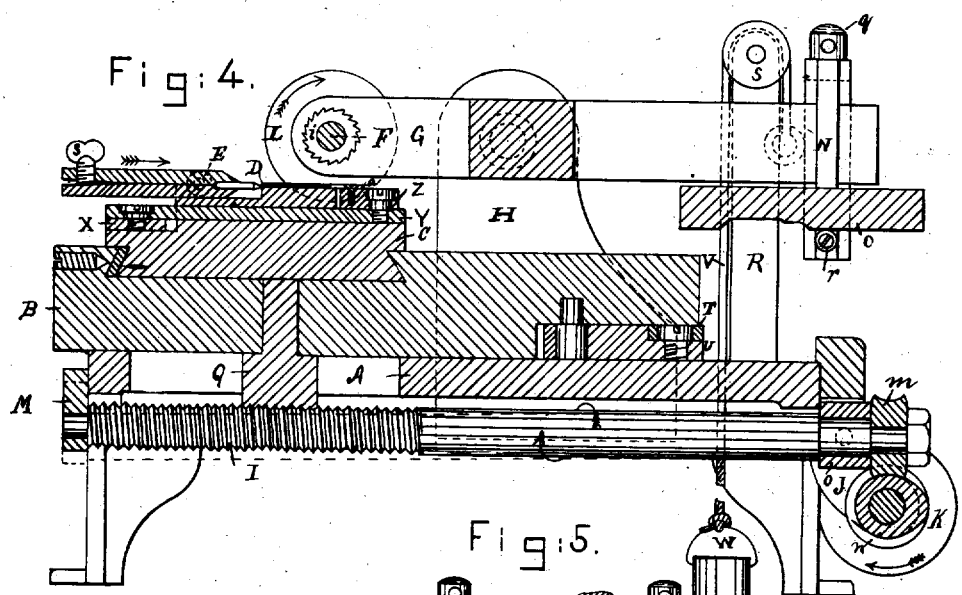
Figure 5:
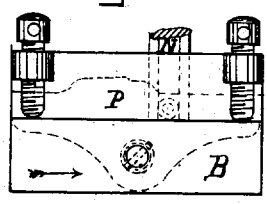

Figure 1 is a front-end elevation of my improved machine. Fig. 2 is a plan of the same. Fig. 3 is a perspective view of the milling-cutters and arbor for the same, and of the devices for securing the series of needles in their several positions on the die-seat, with small portions of the slide and bed of the machine. Fig. 4 is a longitudinal section of the machine through the line *x x*, Figs. 1 and 2. Fig. 5 is a view of the former and parts connected therewith, with a portion of the slide to which the same is attached. Fig. 6 is an enlarged view of a sewing-machine needle, with the blade shown in section, in order to clearly show the form of the bottoms of the grooves in the same. Fig. 7 is a detached perspective view of the clamp, in which the shanks of the several needles are placed previous to securing their blades in position to be grooved.

A of the accompanying drawings is the bed of the machine.

B is the traversing carriage.

C is an adjustable block fitted to the carriage B.

D is the seat, provided with a series of grooves for the reception of the blades of the needles.

E is the clamp, in which are placed the shanks of the needles previous to placing the blades of the same in their respective grooves of the seat D.

F is the milling-cutter arbor, and G the carrier, which furnishes bearings therefor. H H′ are uprights secured to the sides of the bed A.

I is the feed-screw for operating the carriage B and parts connected therewith.

J is a bearing secured to the rear end of the bed A, for receiving the mechanism for driving the feed-screw I.

K is the pulley for driving the mechanism which operates the feed-screw I.

L is the pulley for driving the milling cutter arbor F.

M is the lever for receiving the front bearing of the feed-screw I.

N is an adjustable slide fitted to the rear end of the carrier G.

O is a cam-like former, which, co-operating with the slide N and weight W, serves to automatically govern the period during the movement of the carriage B, when a milling-cutter shall strike the blade of a needle, and the depth to which the cutter shall penetrate the said blade.

P is an adjustable plate secured to the rear end of the carriage B, and to which is adjustably secured the said former O.

Q is the feed-nut attached to the carriage B, and in which works the feed-screw I.

R is an upright bar secured to the bed A. S is a loose pulley thereon.

T is a lever attached to the bed A, to operate the carriage B at times when the feed-screw I is detached from the feed-nut Q.

U is a connecting-bar attached at one end to the carriage B and at the other end to the lever T.

V is a cord attached to one end of the carrier G and extended over the pulley S, where it has attached to it the pail W, containing scraps of iron or other material, the pail and iron acting as a weight.

X is a lever secured to the adjustable block C.

Y is a connecting-bar attached to the lever X and fitted to slide in a groove under the seat D.

Z is a cross-bar attached at the center to the connecting-bar Y.

*a a* are a series of tapering keys (in the present case fifteen in number) secured at one end to the cross-bar Z, and are designed to secure the several needle-blades in their respective grooves on the seat D.

*b* is the spindle to which is fitted the shank of the milling-cutter arbor F.

*c* is a bearing for the opposite center of the cutter-arbor F.

*d* is an adjustable stop secured to the side of the carriage B.

*e* is a shipper-rod under the bed A. The end of the said rod passes through the front end of the bed A and acts as a support for the lever M.

*f* is a stop-pin which passes through a slot in the bed A and is secured to the shipper-rod *e*.

*g g'* are short bars secured to the sides of the carriage B.

*h h'* are screws passing through the bars *g g'*, and are designed to adjust the seat D and parts connected therewith to a proper position with respect to the milling-cutters.

*i i* are a series of milling-cutters (in the present case fifteen in number) fitted to the cutter-arbor.

*j j* are washers (fifteen in number) fitted to the cutting-arbor F, to fill the spaces between the cutters *i i*.

*k* is a nut on the end of the cutter-arbor F, to secure the milling-cutters *i i* and washers *j j* rigidly thereto.

*l l'* are screws passing through the uprights H H', the points of the same entering the carrier G to act as centers.

*m* is a worm-wheel secured to the end of the feed-screw I.

*n* is an endless screw, which works into the teeth of the worm-wheel *m*.

The bearing *o* for the feed-screw I is held in position by means of two screws, *p p'*, the points of which enter the sides of and support the bearing, and at the same time allow it and the feed-screw to oscillate sufficiently to disconnect the latter from the feed-nut Q, when desired.

*q* is a screw for adjusting the position of the slide N with respect to the carrier G.

*r* is a roll fitted to play freely on a pin at the lower end of the slide N, and is designed to follow the uneven surface of the former O.

I will now proceed to describe the practical operation of my improved machine with reference to the accompanying drawings.

It is to be understood that two of the clamps E are to be made to accompany the machine, with jaws of sufficient width to receive that number of needles which the grooves in the seat are designed to accommodate. After filling the clamp E with needles and securing their shanks rigidly between the jaws of the clamp by means of the thumb-screw *s*, or its equivalent, the clamp, with the needles in the same, is then placed on the top of the seat, with the needles resting in their respective grooves. The rear edge of the clamp is now brought against the stop *t* on the front edge of the seat D, in the manner shown in the plan of the machine, Fig. 2, and perspective drawing, Fig. 3. When in this position the series of tapering keys *a a*, which are fitted to slide in the grooves by the sides of the needle-blades, are now brought against the said blades by pulling the lever X, which is connected to said keys by means of the connecting-bar Y and cross-bar Z, such operation rigidly securing all the needle-blades in their respective grooves by wedging them between the tapering keys and vertical walls of the grooves of the seat D, the opposite walls of the grooves, in which the needles and keys are placed, being made at an angle to correspond with the tapering edges of the latter, so that the act of pulling the lever X and keys *a a* forward necessarily forces the latter against the blades of the needles and limits their motion, thus binding the needles very securely in their respective places. Having thus secured the blades of the needles in the manner described, they are now ready to be grooved by the milling-cutters *i i*, which correspond in number to the needles. Said cutters are understood to revolve in the direction indicated by the arrow drawn upon the driving-pulley L, and the operation of grooving to commence near the point of the blade and finish at the shank.

Referring to the enlarged drawing of the needle, Fig. 6, it will be noticed that the long groove between the shank and the point *u*, just above the eye *v*, is made deeper than the remaining portion of the groove. This form of groove is generally adopted in order to give perfect freedom for the thread to pass between the cloth or other material and the bottom of the groove while the shuttle is taking up the slack thread, and at the same time the center stock of the needle, between the long and short grooves, (which is below the work at the time above mentioned,) is thick enough at the eye to prevent the cutting of the thread by the end walls of the eye.

In order to permit the edges of the rapidly-revolving milling-cutters to be positively placed against the blades of the needles during the movement of the carriage, and at exactly the proper time, and so as not to strike the blades of the needles too quickly and injure them, and to thereafter control the exact time at which the acting surfaces of the milling-cutters shall approach, meet, and descend toward the centers of the blades being grooved, I have employed the cam-like former O fixed to the sliding carriage B. I have added to the carrier G the slide N and roll *r*, and to keep the roll up against the former I have employed the weight W and cord V. The former O is so shaped as to permit the weight at the proper time to force the cutter controlled by the former against and into the blades of the separate independent needle-blanks to the desired depth, all as the carriage is being moved longitudinally with the blades of the needles. The feed-screw I, revolving in the direction indicated by the arrow drawn upon the same in Fig. 4, the carriage B, being connected to the feed-screw I by the feed-nut Q, will be moved under the milling-cutters, and carry the several needle-blades in the plane of the cutters, the teeth of the latter being in the meantime forced into the needle-blades as deep as the surface of the former O will allow, the needles continuing to move under the milling-cutters automatically until the adjustable stop *d* on the right side of the carriage B strikes the stop-pin *f* attached to the shipper-rod *e*, which causes the end of the latter to move from under the lever M, and allows the latter, together with the feed-screw I, to drop sufficiently to disconnect the said feed-screw from the feed-nut Q, when the forward motion of the carriage is discontinued and the operation of grooving the needles ceases, the adjustable stop *d* having previously been adjusted in such a position as to cause the forward motion of the carriage B to cease when the shanks of the needles reach the milling-cutters. The long groove of the needles being now finished, the operator brings the needles and carriage back to their original position by means of the lever T, after which the needles are released from their confined positions in the grooves on the seat D by means of the lever X, which operates the series of keys *a a* simultaneously. The needles, together with the clamp E, in which the shanks are secured, are now removed from the machine, and another clamp, similar to E, which has previously been filled with the shanks of another set of needles in the manner before described, is placed in position on the seat D, and the needle-blades secured in their respective grooves on the seat, in the same manner as for the preceding set of needle-blades, after which the lever M is raised to its original position, which allows the end of the shipper-rod *e* to pass under and support the same, and causes the feed-screw I to again connect with the feed-nut Q, when the carriage B and series of needles are again moved forward under the cutters, and the grooving operation repeated, as before described.

The above description of the former and the motion of the slide is to be understood as applicable to grooving the long-groove side of the needle-blade only. The needles which have just been removed from the machine are to remain in the clamp E, and be passed to another machine of the same general construction, but having a former attached which corresponds in shape to the bottom of the short groove to be made on the opposite side of the needle-blade, the needles being secured in their respective places in the same manner as for grooving the long groove on the opposite side of the blade, the motion of the slide being adjusted to suit the length of the short groove.

The clamp E has semicircular grooves made on the face of each jaw corresponding in size to the shanks of the needles, and at such a distance from each other as to coincide with the grooves made for the needle-blades on the seat D.

Thus I groove a series of needles with as much accuracy and with nearly as much rapidity as has heretofore been accomplished upon one needle only by the various methods and devices heretofore adopted.

I am aware that a carriage, half-nut, and screw are old.

Having thus described my invention, I claim as new and desire to secure by Letters Patent—

1. In an organized machine for grooving the blades of sewing-machine needles, a clamp to hold the blade of the needle-blank to be grooved, a clamp-moving carriage having a half-nut and feed-screw to move the carriage, and a rotating grooving or milling cutter combined with a former or cam shaped to determine when the cutters shall strike the blank and the length, depth, and contour of the groove to be cut therein during the movement of the carriage and blade, and with means to automatically release the feed-screw and half-nut and stop the movement of the carriage as the groove in the blade is completed, substantially as described.

2. In combination, the seat D, series of two or more tapering keys, *a a*, cross-bar Z, connecting-bar Y, lever X, adjustable block C, and carriage B, and the series of two or more revolving milling-cutters *i i*, substantially as and for the purpose specified.

3. The combination of the clamp E, seat D, series of two or more keys, *a a*, cross-bar Z, connecting-bar Y, lever X, adjustable bed C, slide B, feed-nut Q, feed-screw I, cutter-arbor F, spindle *b*, center bearing, *c*, swinging beam G, adjustable slide N, roll *r*, and former O, constructed substantially as and for the purpose specified.

SAMUEL C. KINGMAN.

Witnesses:

ISAAC HOLDEN,

A. W. KIRSCH.